United States Patent [19]

Burke

[11] Patent Number: 4,959,950
[45] Date of Patent: Oct. 2, 1990

[54] HARVESTER FOR GRAPES

[75] Inventor: Desmond C. Burke, Victoria, Australia

[73] Assignee: U.R. Engineering Pty. Ltd., Mildura, Australia

[21] Appl. No.: 424,132

[22] Filed: Oct. 19, 1989

[30] Foreign Application Priority Data

Oct. 19, 1988 [AU] Australia ................. PJ1050

[51] Int. Cl.⁵ .................................... A01D 46/26
[52] U.S. Cl. ............................. 56/340.1; 56/330
[58] Field of Search ............. 56/328.1, 330, 331, 56/340.1

[56] References Cited

U.S. PATENT DOCUMENTS

| | | | |
|---|---|---|---|
| 4,286,426 | 9/1981 | Orlando et al. | 56/340.1 X |
| 4,418,521 | 12/1983 | Orlando et al. | 56/330 |
| 4,621,488 | 11/1986 | Claxton | 56/340.1 X |

Primary Examiner—Thuy M. Bui
Attorney, Agent, or Firm—Flehr, Hohbach, Test, Albritton & Herbert

[57] ABSTRACT

A picking head suitable for use with a harvester, which includes a mobile carriage. The picking head comprises a support frame having a support frame axis which in the operative position extends generally in the same direction as the normal line of travel of the harvester and link means operatively connected to the mobile carriage of harvester when in the operative position. The link permits lateral vibrational movement of the support frame with respect to the direction of said support frame axis. The support frame is adapted to have secured thereto harvesting elements which, in the operative position are secured to the support frame so that the lateral vibrational movement of the support frame causes lateral vibrational movement of the harvesting elements.

16 Claims, 3 Drawing Sheets

FIG 1

HARVESTER FOR GRAPES

BACKGROUND OF THE INVENTION

This invention relates to harvesting machines and more particularly though not exclusively to harvesting machines suitable for harvesting grapes and the like.

One type of harvesting machine currently in use comprises harvesting elements comprising a pair of elongated shaker bars which extend generally parallel to one another and are arranged to receive the stem of the vine therebetween. The shaker bars are subjected to a vibratory motion which causes them to shake the vine stem thereby dislodging the fruit from the vine.

Because of the manner of mounting of the shaker bars on the currently used harvesters, it has been found that damage can be done to the vines by rubbing of the shaker bars on the vine stem. Furthermore, the means for imparting the vibratory motion to the shaker bars is generally complicated.

It is an object of the present invention to provide an improved picking head for a harvesting machine which is relatively versatile in nature and can alleviate one or more of the aforementioned disadvantages.

SUMMARY OF THE INVENTION

According to one aspect of the present invention there is provided a picking head suitable for use with a harvester, the harvester including a mobile carriage, the picking head a support frame having a support frame axis which in the operative positioning extends generally in the same direction as the normal line of travel of the harvester, link means operatively connected to the mobile carriage of the harvester when in the operative position, said link means permitting lateral vibrational movement of said support frame with to the direction of said support frame axis support frame being adapted to have secured harvesting elements which, in the operative are secured to said support frame so that lateral vibrational movement of said support frame causes lateral vibrational movement of the harvesting elements.

Preferably the picking head a main frame which in the operative is operatively connected to the mobile carriage and the link means operatively interconnects the frame and the main frame.

Preferably the link means includes one or more link assemblies the or each link assembly comprising a four bar linkage arranged so to be disposed in a plane which is generally at angles to the support frame axis. In a form, each assembly comprises two spaced inks one end of each link being pivotally to the main frame and the other end of each link being pivotally connected to the support so that the support frame is suspended from the frame by the two links in the or each assembly.

Preferably two link are provided, the plane of each assembly being in spaced apart relation and generally parallel to one another.

The main frame, the support frame and the two links which together form the four bar linkage of the or each assembly may be oriented in a number of ways. For example, they may be arranged to form a parallelogram linkage in which the support frame's orientation relative to the main frame remains generally unchanged during relative movement therebetween. That is, for example, if the main frame is disposed generally horizontally the support frame will remain generally horizontal during its vibratory motion relative to the main frame. In another arrangement, the pivotal connection points of the links the main frame are spaced further apart than the pivotal connection points of the links to the support frame so that the four bar linkage is trapezoidal in shape and the vibratory movement causes the support frame to ti relative to the main frame. This latter arrangement is particularly useful where a relatively large vibratory motion is required to provide an adequate shaking motion to the vines. Preferably the position of the pivot points of the links to the main frame and/or the links to the support frame can be adjusted so as to obtain optimum conditions for the vines being harvested.

According to one preferred form of the invention the harvesting elements may co a pair of elongated shaker bars of the type referred to earlier, each having a longitudinal axis which extend generally parallel to the support frame axis. The shaker bars are arranged in spaced apart relationship with respect to each other and are generally parallel to one another. Preferably the elongated shaker bars each have a leading edge portion which diverges away from the other bar so as to define a tapering lead in guide portion.

Preferably the harvesting elements are operatively connected to the support frame by means of one or more mounting arms. One end portion of each of the mounting arms may be operatively connected to the support frame and the other end portion remote from the support frame is adapted to have secured thereto a respective shaker bar. Preferably the mounting arms are pivotally connected to the support frame so that the spacing between the shaker bars can be adjusted. Preferably a piston/cylinder or other mechanism may be provided for causing the adjustment of the two arms.

Preferably the two rails are biased towards one another so that they tend to in use engage against the vine stem. This biasing may be effected by a suitable pressure control system applied to the piston/cylinder mechanism used for adjusting the spacing between the shaker bars. It will be appreciated, however, that other biasing systems could be utilized.

The arms may be generally C-shaped in configuration so that they can extend around the vine foliage with their remote end portions being adjacent the vine stem.

The picking head may further include a motion generator for causing the lateral vibratory movement of the support frame relative to the main frame. Drive means may also be provided for driving the motion generator. In one preferred form the motion generator may comprise a fly wheel mounted to the support frame and rotatable about an axis which extends generally parallel to and preferably co-axial with the central axis of the main frame. The fly wheel may have a weight thereon which is eccentric to the rotation axis of the fly wheel so as to cause the vibratory motion to the support frame. Preferably the position of the weight is adjustable so that the degree of vibration can be varied. The drive means may be in the form of an hydraulic motor operatively connected to the fly wheel.

It will be appreciated that as an alternative to the weight and flywheel, the flywheel or some other element could simply be eccentrically mounted to the drive shaft.

In a preferred embodiment of the present invention the main frame of the picking head is mounted so as to be suspended from the carriage and freely pivotable relative thereto about an axis which extends generally parallel to the support frame axis. This arrangement has the advantage that when in use, the freely pivotable suspension of the picking head will enable compensation should the harvester veer off line during movement along a row of vines.

The harvester of the invention may take any suitable form. For example, the carriage may comprise a framework of structural members having upright sections and a straddling section arranged so that, when in use, the carriage can straddle a row of vines. Ground engaging wheels may be provided on the upright section upon which the carriage can travel. The carriage may be self-powered or adapted to be towed by a vehicle such as a tractor.

Preferably the main frame of the picking head is disposed adjacent the straddling section of the carriage and is pivotally mounted thereto. The main frame of the picking head may be generally rectangular in form and operatively connected to the carriage by means of a pair pivotally mounted arms one end of which is pivotally mounted to the carriage and the other end of which is pivotally mounted to the main frame of the picking head. The arms may be adapted to be raised and lowered with respect to the carriage by means of an actuator, such as, for example, an hydraulic/piston cylinder assembly. It will be appreciated that the main frame of the picking head may be formed by part of the carriage of the harvester rather than as a separate integer.

In addition to or alternatively to the shaker bars, the harvesting elements may comprise picking rods which may be secured to the mounting arms, the picking rods being arranged in banks on each arm and being adapted to move laterally with respect of the central axis of the main frame in response to the vibratory movement of the support frame relative to the main frame.

According to another aspect of the present invention there is provided a harvester including a picking head as described above and which may include one or more of the preferred features of harvesters described above.

BRIEF DESCRIPTION OF THE DRAWINGS

Preferred embodiments of the invention will hereinafter be described with reference to the accompanying drawings in which.

DETAILED DESCRIPTION OF THE PREFERRED EMBODIMENTS

Referring to FIGS. 1-4, the harvester generally indicated at 1 comprises a mobile carriage 2 formed from a framework of structural members comprising upright sections 3 and a straddling section 4 arranged so that the carriage can straddle a row of vines 50 having a stem 51 and foliage 52 from which bunches of grapes 53 are shown. The carriage further includes ground engaging wheels 6 and in the form shown the carriage is self-powered having a driving cabin 8 at an upper section thereof.

Figure 1:
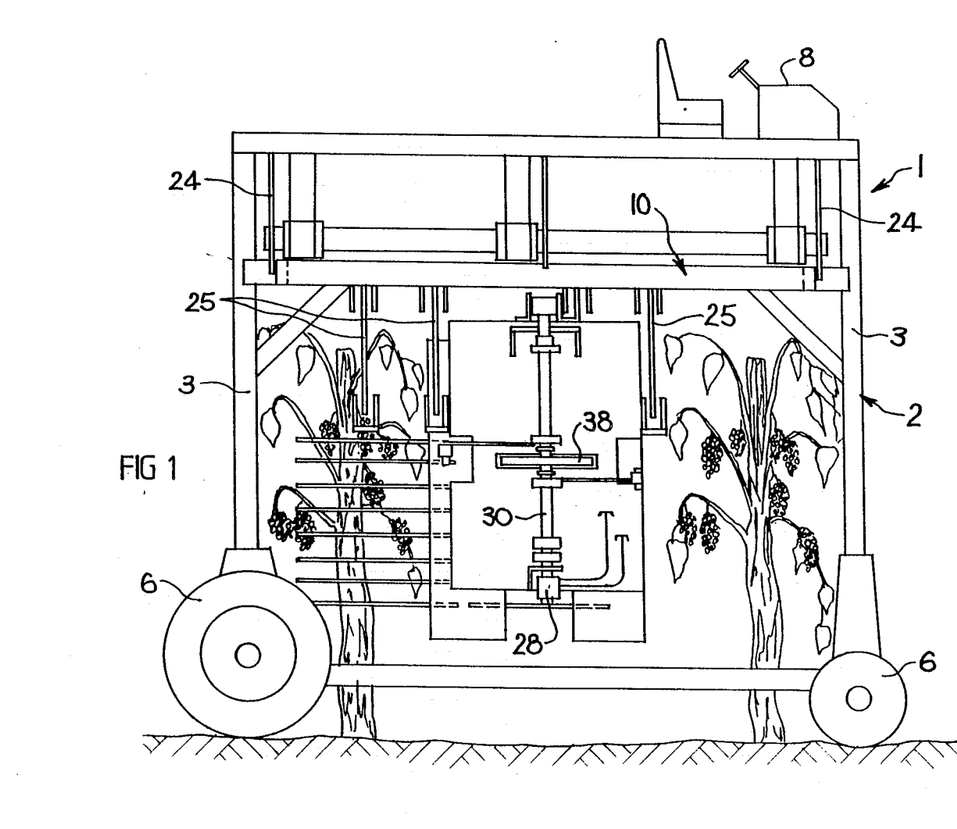
FIG. 1 is a schematic side elevation of a harvester according to the present invention.
Figure 2:
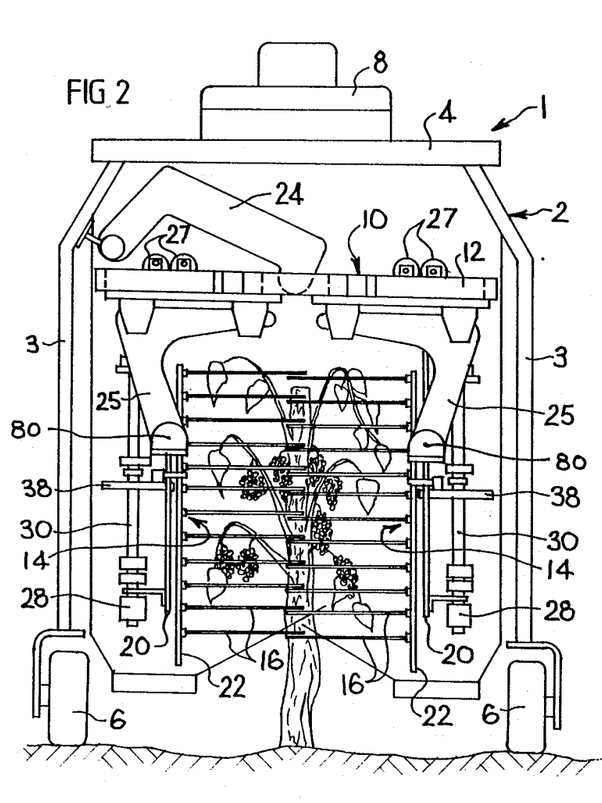
FIG. 2 is a schematic end elevation of the harvester shown in FIG. 1.

The picking head generally indicated at 10 comprises a main frame 12 which is pivotally mounted to the carriage by means of connecting arms 24.

The connecting arms 24 enable the picking head 10 to be raised or lowered relative to the carriage 2. Furthermore, the picking head 10 and in particular the main frame 12 is pivotally mounted to connecting arms 24 so that in use the picking head can be freely pivotable relative to the connecting arms 24. It will be appreciated that under certain operating conditions it may be desirable to lock the picking head relative to the arms 24 and suitable locking means can be provided to achieve this.

The picking head further includes a support frame 14 which is suspended from the main frame 12 by means of a series of link assemblies each comprising links 15 and 16.

Figure 3:
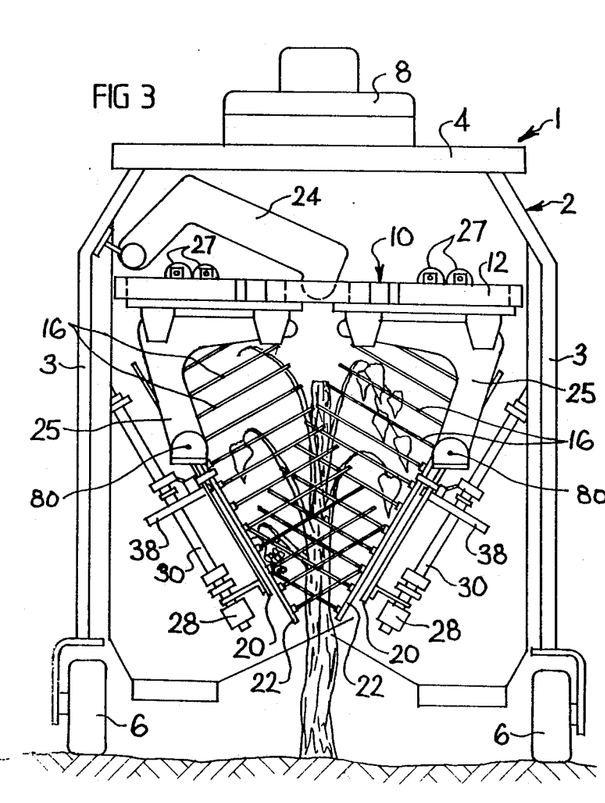
FIG. 3 is a schematic representation of the linkage mechanism in the parallelogram linkage mode.
Figure 4:
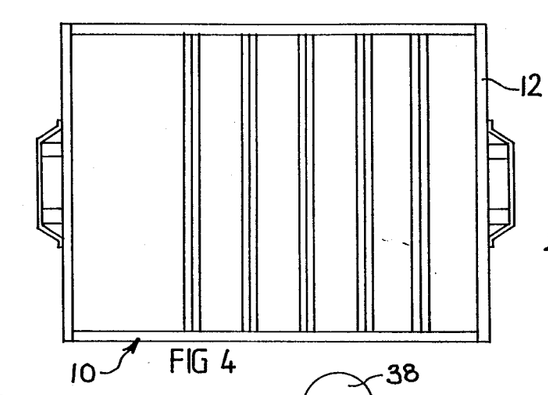
FIG. 4 is a schematic representation of the linkage of the present invention in another mode of another mode of operation.
Figure 5:
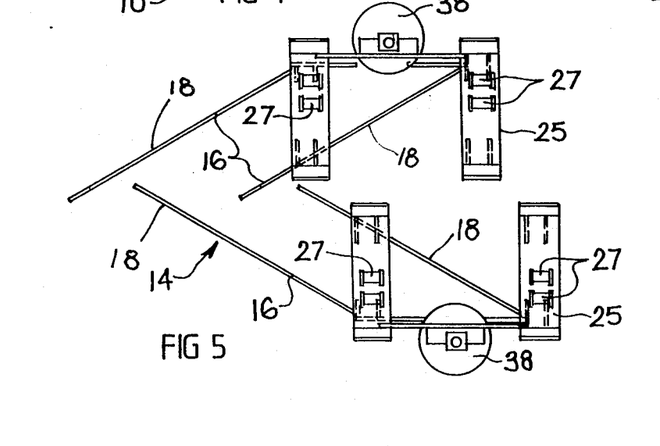
Figure 6:
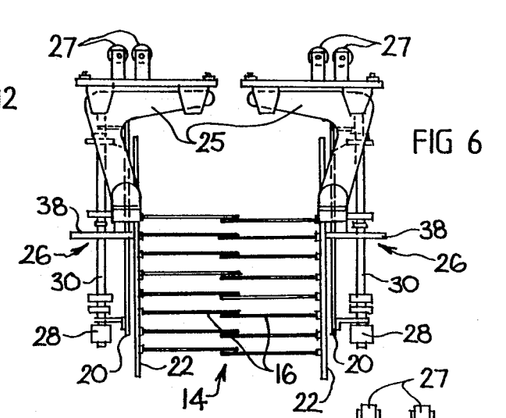
Figure 7:
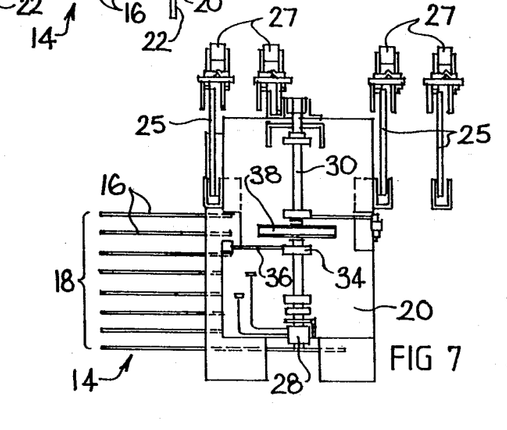

Each link assembly is in the form of a four bar linkage comprised by main frame 12, the two links 15 and 16 and support frame 14. In FIGS. 2 and 3 the linkages are shown in the form of parallelogram linkages whereas as shown in FIG. 4 the linkages are trapezoidal in shape. It will be appreciated that the position of the mounting of the links 15 and 16 to the main frame and support frame to achieve optimum operating conditions for the types of vines upon which the harvester is being used. As will be appreciated vibratory motion applied to the support frame will cause it to move back and forth laterally or sideways with respect to the direction of travel of the harvester.

Mounting arms 17 are pivotally connected to the support frame and extend downwardly therefrom the mounting arms having shaker bars 18 and 19 secured at the lower end thereof. The arms 17 can be pivoted by means of piston/cylinder 35 which enables the disposition of shaker bars 18 and 19 relative to one another to be changed.

As best seen in FIG. 2, the mounting arms 17 have curved inner edges so that the arms can extend around the foliage and the shaker bars 18 and 19 can engage the vine stem. The piston/cylinder 35 may be provided with a suitable pressure control system which biases the shaker bars into contact with the stem 51 of the vine.

Drive means 26 comprises a motor 28 operatively connected to a fly wheel 30 which is secured to a drive shaft carried by the support frame.

Flywheel 30 has a weight thereon which upon rotation of the flywheel causes a vibratory motion to be applied to the support frame 14. The position of the weight can be varied so that the magnitude of the vibrations can be varied. It will be appreciated that as an alternative to this arrangement the drive shaft may be eccentrically mounted.

FIGS. 3 and 4 show the effect of changing the positions of the pivot points on the main frame and support frame. In FIG. 3, the pivot points are arranged so that the four bar linkage is a parallelogram. As can be seen, the support frame 14 remains generally parallel to the main frame 12 during vibratory motion. This arrangement is particularly suitable where vibrations of relatively small magnitude are required. In FIG. 4, the pivot points of the links to the main frame are spaced further apart and as can be seen, the support frame 14 will adopt an inclined disposition to the main frame 12 during vibratory motion. This is particularly suited where vibrations of larger magnitude are used. In this arrangement, the shaker bars tend to follow the vine stem as it bends rather than rubbing on it.

Finally, it is to be understood that variations, modifications and/or additions may be incorporated into the various constructions and arrangements of parts without departing from the spirit or ambition of the invention.

What is claimed is:

1. A picking head suitable for use with a harvester, the harvester including a mobile carriage, the picking head comprising a support frame having a support frame axis which in the operative position extends generally in the same direction as the normal line of travel of the harvester, link means operatively connected to the mobile carriage of harvester when in the operative position, said link means permitting lateral vibrational movement of said support frame with respect to the direction of said support frame axis said support frame being adapted to have secured thereto harvesting elements which, in the operative position are secured to said support frame so that the lateral vibrational movement of said support frame causes lateral vibrational movement of the harvesting elements.

2. A picking head according to claim 1 further including a main frame, which in the operative position, is operatively connected to the mobile carriage and said link means operatively interconnects said support frame and said main frame.

3. A picking head according to claim 2 wherein said link means includes one or more link assemblies the or each link assembly comprising a four bar linkage arranged so as to be posed in a plane which is generally at right angles to the support frame axis.

4. A picking head according to claim 3 wherein two said link assemblies are provided the plane of each said link assembly being spaced apart and generally parallel to one another.

5. A picking head according to claim 4 wherein each said link assembly comprises two spaced apart links one end of each link being pivotally connected to said main frame and the other end of each link being pivotally connected to said support frame so that the support frame is suspended from said main frame by said two links.

6. A picking head according to claim 5 wherein each said four bar linkage is arranged to form a parallelogram linkage to which the orientation of said support frame relative to said main frame remains generally unchanged during relative movement therebetween.

7. A picking head according to claim 5 wherein the pivotal connection points of the links to the main frame are spaced further apart than the pivotal connection points of the links to the support frame so that the four bar linkage is trapezoidal in shape and the vibratory movement causes support frame to tilt relative to the main frame.

8. A picking head according to claims 6 or claim 7 wherein the position of the pivot points of the links to the main frame and/or the links to the support frame can be adjusted so as to obtain optimum conditions for the vines being harvested.

9. A picking head according to claim 8 wherein said mounting arms are pivotally connected to said support frame so that the spacing between the shaker bars can be adjusted.

10. A picking head according to claim 9 wherein said mounting arms have an arcuate edge which in the operative position the arcuate edges facing one another with their remote ends being closer together than the arcuate edges.

11. A harvester according to claim 10, wherein said main frame of said picking head is mounted to said mobile carriage so as to be suspended therefrom and free pivotable relative thereto about an axis which extends generally in the same direction as the support frame axis.

12. A picking head according to claim 1 further including a motion generator for causing the lateral vibratory movement the support frame relative to the main frame, said motion generator comprising a fly wheel mounted to said support frame and rotatable about an axis which extends generally parallel to the support frame axis said fly wheel having a weight thereon which is eccentric to the rotation axis of fly wheel so that rotation of the fly wheel causes the vibratory motion to the support frame.

13. A harvester according to claim 10 or claim 12 wherein said main frame is adapted to be raised or lowered relative to said mobile carriage.

14. A picking head according to claim 12 wherein the position of the weight on the flywheel is adjustable in a radial direction with respect to the axis of rotation thereof.

15. A harvester comprising a mobile carriage, a picking head according to claim 1 operatively connected to said mobile carriage, and harvesting elements operatively connected to said support frame of said picking head.

16. A picking head according to claim 1 wherein the harvesting elements comprise a pair of elongated shaker bars each having a longitudinal axis which extends generally parallel to the support frame axis, the shaker bars being arranged in spaced apart relationship and generally parallel to one another and the picking head further including one or more mounting arms, one end portion of each of said mounting arms being operatively connected to said support frame and other end portion remote from the support frame being adapted to have secured thereto a respective shaker bar.

* * * * *

UNITED STATES PATENT AND TRADEMARK OFFICE
CERTIFICATE OF CORRECTION

PATENT NO. : 4,959,950

DATED : October 2, 1990

INVENTOR(S) : Desmond C. Burke

It is certified that error appears in the above-identified patent and that said Letters Patent is hereby corrected as shown below:

Col. 1, line 30, insert ---comprising--- after "head".

Col. 1, line 36, insert ---respect--- after "with".

Col. 1, line 38, insert ---thereto--- after "secured".

Col. 1, line 39, insert ---position--- after "operative".

Col. 1, line 42, insert ---includes--- after "head".

Col. 1, line 45, insert ---support--- after "the" and before "frame".

Col. 1, line 49, insert ---right--- before "angles".

Col. 1, line 50, delete "inks" and insert ---apart links---.

Col. 1, line 51, insert ---connected--- after "pivotally".

Col. 1, line 53, insert ---frame--- after "support".

Col. 1, line 54, insert ---main--- before "frame".

Col. 1, line 55, insert ---assemblies--- after "link".

Col. 2, line 5, delete "ti" and insert ---tilt--- before "relative".

UNITED STATES PATENT AND TRADEMARK OFFICE
CERTIFICATE OF CORRECTION

PATENT NO. : 4,959,950

DATED : October 2, 1990

INVENTOR(S) : Desmond C. Burke

It is certified that error appears in the above-identified patent and that said Letters Patent is hereby corrected as shown below:

Col. 2, line 13, delete "co" and insert ---comprise-- after "may ".

Signed and Sealed this

Thirtieth Day of June, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,959,950

DATED : October 2, 1990

INVENTOR(S) : Desmond C. Burke

It is certified that error appears in the above-identified patent and that said Letters Patent is hereby corrected as shown below:

The title page should be deleted to appear as per attached title page.

The sheets of drawings should be deleted to be replaced with the three (3) sheets of drawings as shown on the attached pages.

Signed and Sealed this

Eighth Day of September, 1992

Attest:

DOUGLAS B. COMER

Attesting Officer

Acting Commissioner of Patents and Trademarks

United States Patent [19]
Burke

[11] Patent Number: 4,959,950
[45] Date of Patent: Oct. 2, 1990

[54] HARVESTER FOR GRAPES

[75] Inventor: Desmond C. Burke, Victoria, Australia

[73] Assignee: U.R. Engineering Pty. Ltd., Mildura, Australia

[21] Appl. No.: 424,132

[22] Filed: Oct. 19, 1989

[30] Foreign Application Priority Data

Oct. 19, 1988 [AU] Australia ............... PJ1050

[51] Int. Cl.⁵ ........................... A01D 46/26
[52] U.S. Cl. ........................ 56/340.1; 56/330
[58] Field of Search ............... 56/328.1, 330, 331, 56/340.1

[56] References Cited

U.S. PATENT DOCUMENTS

| | | | |
|---|---|---|---|
| 4,286,426 | 9/1981 | Orlando et al. | 56/340.1 X |
| 4,418,521 | 12/1983 | Orlando et al. | 56/330 |
| 4,621,488 | 11/1986 | Claxton | 56/340.1 X |

Primary Examiner—Thuy M. Bui
Attorney, Agent, or Firm—Flehr, Hohbach, Test, Albritton & Herbert

[57] ABSTRACT

A picking head suitable for use with a harvester, which includes a mobile carriage. The picking head comprises a support frame having a support frame axis which in the operative position extends generally in the same direction as the normal line of travel of the harvester and link means operatively connected to the mobile carriage of harvester when in the operative position. The link permits lateral vibrational movement of the support frame with respect to the direction of said support frame axis. The support frame is adapted to have secured thereto harvesting elements which, in the operative position are secured to the support frame so that the lateral vibrational movement of the support frame causes lateral vibrational movement of the harvesting elements.

16 Claims, 3 Drawing Sheets

Fig 1

Fig 2